United States Patent

Kimura

[11] Patent Number: 5,983,249
[45] Date of Patent: Nov. 9, 1999

[54] CARD DRIVEN ELECTRONIC APPARATUS

[75] Inventor: Masatoshi Kimura, Itami, Japan

[73] Assignee: Mitsubishi Denki Kabushiki Kaisha, Tokyo, Japan

[21] Appl. No.: 08/371,446

[22] Filed: Jan. 11, 1995

Related U.S. Application Data

[63] Continuation of application No. 08/091,195, Jul. 14, 1993, abandoned.

[30] Foreign Application Priority Data

Jul. 15, 1992 [JP] Japan ................................. 4-188121

[51] Int. Cl.$^6$ ....................................................... G06F 3/00
[52] U.S. Cl. ............................................ 708/140; 361/686
[58] Field of Search .............................. 364/708.1, 709.1; 361/686

[56] References Cited

U.S. PATENT DOCUMENTS

| | | | |
|---|---|---|---|
| 4,722,065 | 1/1988 | Ogawa | 364/709.1 |
| 4,924,355 | 5/1990 | Mitchell et al. | 361/686 |
| 5,036,481 | 7/1991 | Lunsford et al. | 361/686 |
| 5,038,308 | 8/1991 | Le et al. | 364/708.1 |
| 5,183,404 | 2/1993 | Aldous et al. | 439/55 |
| 5,426,564 | 6/1995 | Hsu | 361/683 |
| 5,440,448 | 8/1995 | Stewart et al. | 361/684 |
| 5,497,464 | 3/1996 | Yeh | 364/708.1 |

FOREIGN PATENT DOCUMENTS 0201628  11/1986  European Pat. Off. .

OTHER PUBLICATIONS

"Memory Card"; Mitsubishi Electric; Jul. 1993.
"Dram Card Guidelines Ver. 1.0" Japan Electronic Industry Dev. Assoc. Personal Computer Operation Committee; Sep. 1991.
"IC Memory Card Guidelines Ver. 4.1"; JEIDA; 1991.
"PC Card Standard"; Personal Computer Memory CArd International Association; Release 2.0; Sep. 1991.

Primary Examiner—Tan V. Mai
Attorney, Agent, or Firm—Leydig, Voit & Mayer, Ltd.

[57] ABSTRACT

An electronic circuit portion housed beneath a keyboard of a main body of an electronic apparatus is provided. The electronic apparatus includes a mother board and a plurality of card-like function media (cards) which are removably connected to the mother board. Each of the cards is separately provided with the functions of the electronic apparatus. These cards are connected to each other by the mother board, and thus the functions of the electronic apparatus are effected. Each card is formed of an integrated circuit card. No magnetic elements, such as floppy or hard disks, are used.

14 Claims, 8 Drawing Sheets

CARD DRIVEN ELECTRONIC APPARATUS

This application is a continuation of application Ser. No. 08/091,195, filed Jul. 14, 1993 now abandoned.

BACKGROUND OF THE INVENTION

1. Field of the Invention

The present invention relates to a construction of an electronic circuit portion of various types of electronic apparatuses such as personal computers.

2. Description of the Related Art

FIG. 7 is a perspective view illustrating the appearance of a notebook personal computer 100 shown as an example of a conventional electronic apparatus. The personal computer 100 comprises a main body portion 110 and a lid portion 120 which is openable/closable in such a manner as be to be folded over the main body portion 110. The main body portion 110 has housed therein an electronic circuit portion 130 (see FIG. 9), and a keyboard 13 is disposed on the top surface of the portion 110. A display section 12 formed of a liquid-crystal display (LCD) device is disposed in the lid portion 120. The display section 12 and the keyboard 13 are connected to the electronic circuit portion 130 through a predetermined means. FIG. 8 is a block diagram illustrating such a basic construction of the conventional notebook personal computer, in which the functions of the computer are considered. In the conventional personal computer, the electronic circuit portion 130 is generally mounted on a single-board computer 15 and housed in the main body portion 110, as shown in FIG. 9.

Referring to FIG. 8, reference numeral 1 denotes a microprocessor section; reference numeral 2 denotes a cashe memory section; reference numeral 3 denotes a numerical computational operation coprocessor section, the above components performing data processing and data control. Reference numeral 4 denotes a main memory section; and reference numeral 5 denotes a basic input/output system (BIOS) section. Reference numeral 6 denotes a diskette controller section (for floppy disks); and reference numeral 7 denotes a diskette drive section (for floppy disk drives), the above components being used for driving a floppy disk (not shown). Reference numeral 8 denotes a hard disk drive section. Reference numeral 9 denotes a graphic subsystem section; and reference numeral 12 denotes a display section, these components forming a display function section. Reference numeral 11 denotes a disk emulator section which is used to provide compatibility between the microprocessor 1 and other devices such as disks. Usually, this type of system has two types of buses: a main bus 40 and an input/output bus 41 which is a low speed bus. The components designated by reference numerals 1 to 9, and 11 and 12 are connected to the main bus 40. Reference numeral 10 denotes a bus interface section for interfacing between the main bus 40 and the I/O bus 41; reference numeral 13 denotes a keyboard; reference numeral 13a denotes a keyboard controller section; reference numeral 14 denotes an expansion memory card for expanding memory when the capacity of the main memory section 4 is insufficient. The components designated by reference numerals 13, 13a and 14 are connected to the I/O bus 41.

All the above-described components except the display section 12 and the keyboard 13 are mounted on the single-board computer 15 as shown in FIG. 9. The diskette drive section (for floppy disk drives) 7 and the hard disk drive section 8 are connected onto the single-board computer 15 through a flat cable (not shown) or the like. The other components are mounted on the single-board computer 15, each component having a different IC package configuration. Discrete components (not shown) such as resistors or capacitors are also mounted on the single-board computer 15.

The configuration of an IC package for each functional blocks has various forms, for example, DIP (Dual In Line Package), PGA (Pin Grid Array), SOP (Small Outline Package), or PLCC (Plastic Leaded Chip Carrier). Generally, these IC packages are all hybrid-mounted on one board. The display section 12 and the keyboard 13 are connected to the single-board computer 15 through a predetermined connection means. In this example, only the expansion memory card 14 is connected to the single-board computer 15 so the card can be mounted/dismounted easily.

However, as described above, since generally most of the electronic circuit portions of a conventional electronic apparatus are mounted on a single-board computer, problems described below arise:

(1) It is necessary to develop an entirely new single-board computer each time the functions of an electronic apparatus are changed, i.e., a model change is made, thus a tremendous amount of development work is required.

(2) It is necessary to develop a new single-board computer even when a need to change only some of the functions arises, and therefore a tremendous amount of development work and costs are required.

(3) When some of the parts become defective, it takes a great amount of time to locate such defective portions. Furthermore, even if a defective portion can be located, there is a risk in that very fine patterns on the board will be destroyed during repair, in a worst case, the entire single-board computer may be inoperable.

(4) When a serious failure occurs when a user uses the electronic apparatus, it is very difficult to repair the apparatus on site, and therefore it takes a very large amount of time to correct the failure.

(5) Since a diskette drive and a hard disk drive are mounted, a large amount of power is consumed, and therefore it is difficult to drive the electronic apparatus using a battery.

(6) Since a diskette drive and a hard disk drive are mounted, it is difficult to achieve an electronic apparatus which is thin and light weight. Even a 1.8-inch hard disk drive apparatus, which is the smallest one available at present, has a thickness of 10 to 20 mm.

(7) The performance of the single-board computer determines the performance of the electronic apparatus, and therefore it is impossible to change to another apparatus having different functions from the former apparatus.

(8) Since a magnetic storage medium such as a diskette drive or a hard disk drive is used, the electronic apparatus is vulnerable to vibrations and shocks. Also, the electronic apparatus must be handled carefully during carrying and transport thereof, which is troublesome.

(9) Since a diskette drive a nd a hard disk drive are used, access speed is very slow, and thus the electronic apparatus lacks operability.

SUMMARY OF THE INVENTION

The present invention has been achieved to solve the above-mentioned problems of the prior art.

It is an object of the present invention to provide an electronic apparatus, whose electronic circuit portions can be replaced in function block units and changed to a system having completely different functions by changing some of or all of the functions.

To achieve the above object, according to a first aspect of the present invention, there is provided an electronic apparatus having at electronic circuit portion, the electronic circuit portion comprising: a plurality of card-like function media of a credit card size, formed separately in function block units in such a way that the functions of the electronic apparatus are separately formed in several function blocks; and a mother board having a plurality of connectors for fixedly connecting these card-like function media in such a way that the media can be mounted/dismounted, and a bus section for electrically connecting the card-like function media fixedly connected to these connectors to each other.

According to a second aspect of the present invention, there is provided an electronic apparatus comprising: an electronic circuit portion comprising: a plurality of card-like function media of a credit card size, formed separately in function block units in such a way that the functions of the electronic apparatus are separately formed in several function blocks; a plurality of connectors for fixedly connecting these card-like function media in such a way that the media can be mounted/dismounted; and a mother board having a bus section including a main bus (high-speed bus) and an input/output bus (low-speed bus), which are independent of each other, for electrically connecting the card-like function media fixedly connected to these connectors to each other, said plurality of card-like function media including a bus interface card for interfacing between the input/output bus and the main bus; input means which is electrically connected to the electronic circuit portion; and display means which is electrically connected to the electronic circuit portion.

According to a third aspect of the present invention, there is provided an electronic apparatus comprising: an electronic circuit portion comprising: a plurality of card-like function media of a credit card size, formed separately in function block units in such a way that the functions of the electronic apparatus are separately formed in several function blocks; a plurality of connectors for fixedly connecting these card-like function media in such a way that the media can be mounted/dismounted; and a mother board having a bus section including a main bus and an input/output bus, which are independent of each other, for electrically connecting the card-like function media fixedly connected to these connectors to each other; input means which is electrically connected to the electronic circuit portion; and display means which is electrically connected to the electronic circuit portion, wherein said plurality of card-like function media includes at least an access key card in which ID codes for authorizing use of the electronic apparatus, and access information for specifying right of access to each of the card-like function media and an access permission range for a data storage area of the card-like function media are stored; an OS/application card in which an operation system, and an application program including an authorization program for permitting use of the electronic apparatus are stored; and a microprocessor card for performing data processing and data control, performing an authorization operation on the basis of an ID code input from the input means and on the basis of the ID codes stored in the access key card in accordance with an authorization program stored in the OS/application card, and controlling access to each card in accordance with the access information.

According to a fourth aspect of the present invention, there is provided an electronic apparatus in which a floppy disk drive and a hard disk drive, which are magnetic storage apparatus, are not used, comprising: a display section; a main body portion having a keyboard on the top surface thereof; an electronic circuit portion comprising: a plurality of card-like function media of a credit card size, formed separately in function block units in such a way that the functions of the electronic apparatus are separately formed in several function blocks; and a mother board including a plurality of first connectors for fixedly connecting these card-like function media in such a way that the media can be mounted/dismounted, a plurality of second connectors for connecting the keyboard and the display section, and a bus section for electrically connecting each of the card-like function media, the keyboard, and the display section fixedly connected to the first and second connectors, to each other, said electronic circuit portion being disposed within the main body in such a way that each card-like function medium can be mounted/dismounted from the outside.

In the electronic apparatus in accordance with the first aspect of the present invention, since the electronic circuit portion is formed of a mother board and a plurality of removable card-like function media, which are connected to the mother board, and which are separated in function block units, it is easy to change some of the functions of the electronic circuit portion by replacing the card-like function medium, and an such that electronic apparatus having completely different types of functions can be constructed.

In the electronic apparatus in accordance with the second aspect of the present invention, the mother board of the electronic circuit portion has different types of buses of a main bus which is a high-speed bus and an input/output which is a low-speed bus, a bus interface provides interface between the two buses, and an electronic apparatus having the same functions and the same bus construction as those of the conventional personal computer can be realized.

In the electronic apparatus in accordance with the third aspect of the present invention, the access key card provides security for access from the outside.

In addition, in the electronic apparatus in accordance with the fourth aspect of the present invention, the electronic circuit portion housed beneath a keyboard of the main body of the electronic apparatus is formed of a plurality of card-like function media and a mother board for fixedly connecting these card-like function media in such a way that the media can be mounted/dismounted, and no magnetic storage apparatuses such as floppy disk drives (FDD) or hard disk drives (HDD) are used. As a result, it is possible to form the electronic apparatus into an apparatus which is small, thin, and light in weight, and which consumes a small amount of power.

DESCRIPTION OF THE PREFERRED EMBODIMENT

An embodiment of the present invention will be explained below with reference to the accompanying drawings.

Figure 1:
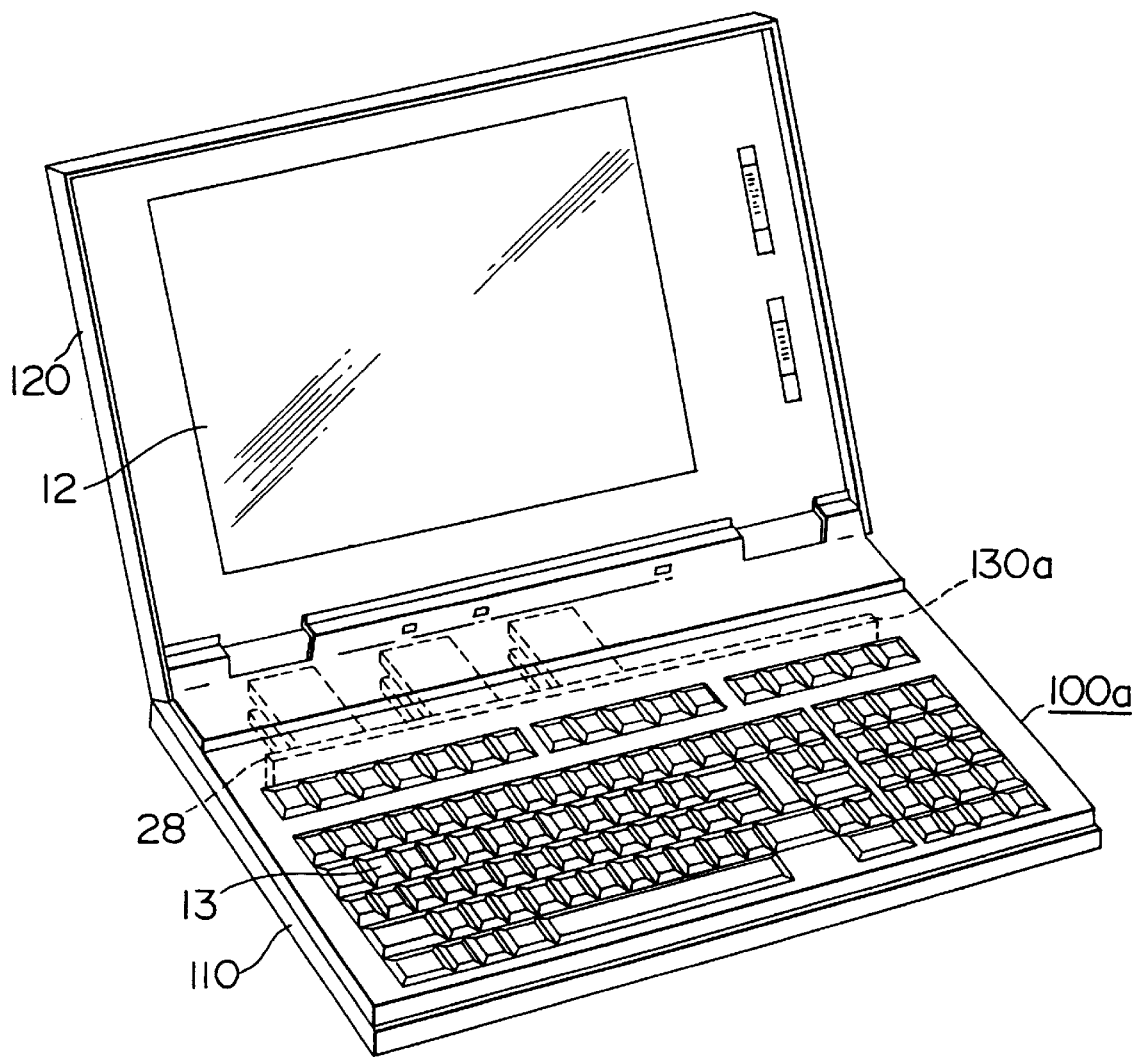
FIG. 1 is a perspective view of a notebook personal computer in accordance with an embodiment of the present invention.
Figure 2:
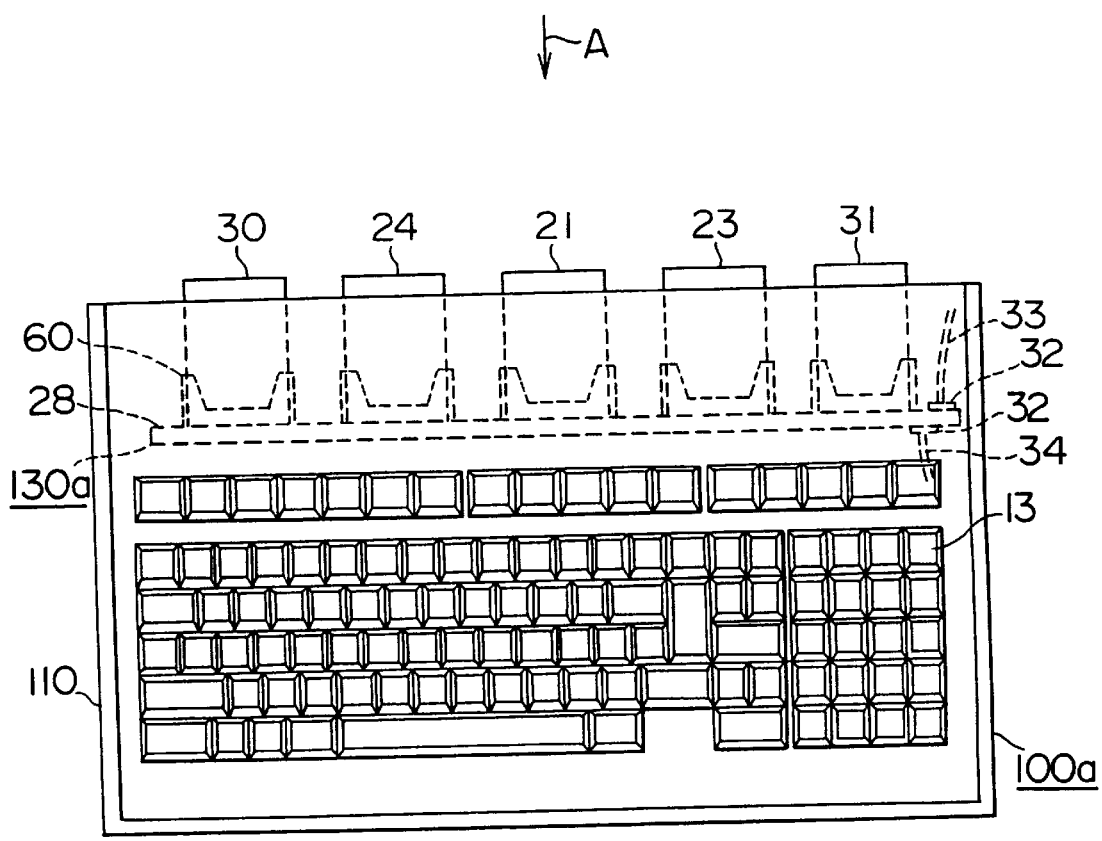
FIG. 2 is a plan view in which a lid portion of the personal computer shown in FIG. 1 is removed.
Figure 3:
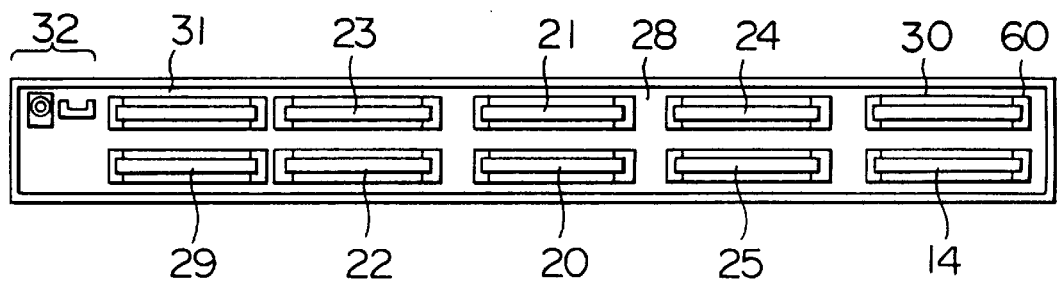
FIG. 3 is a side view of the personal computer of FIG. 2 taken in the direction of the arrow A.
Figure 4:
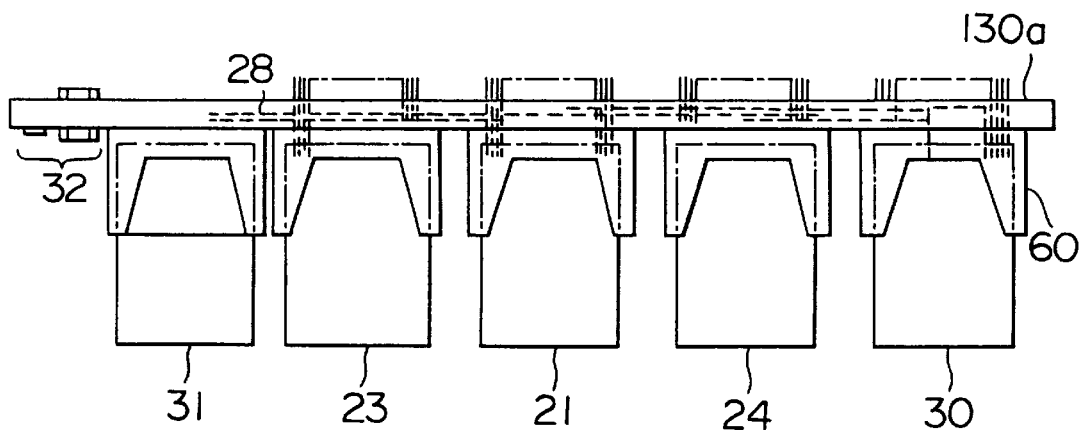
FIG. 4 is a view in which the electronic circuit portion shown in FIGS. 1 to 3 is taken out.
Figure 5:
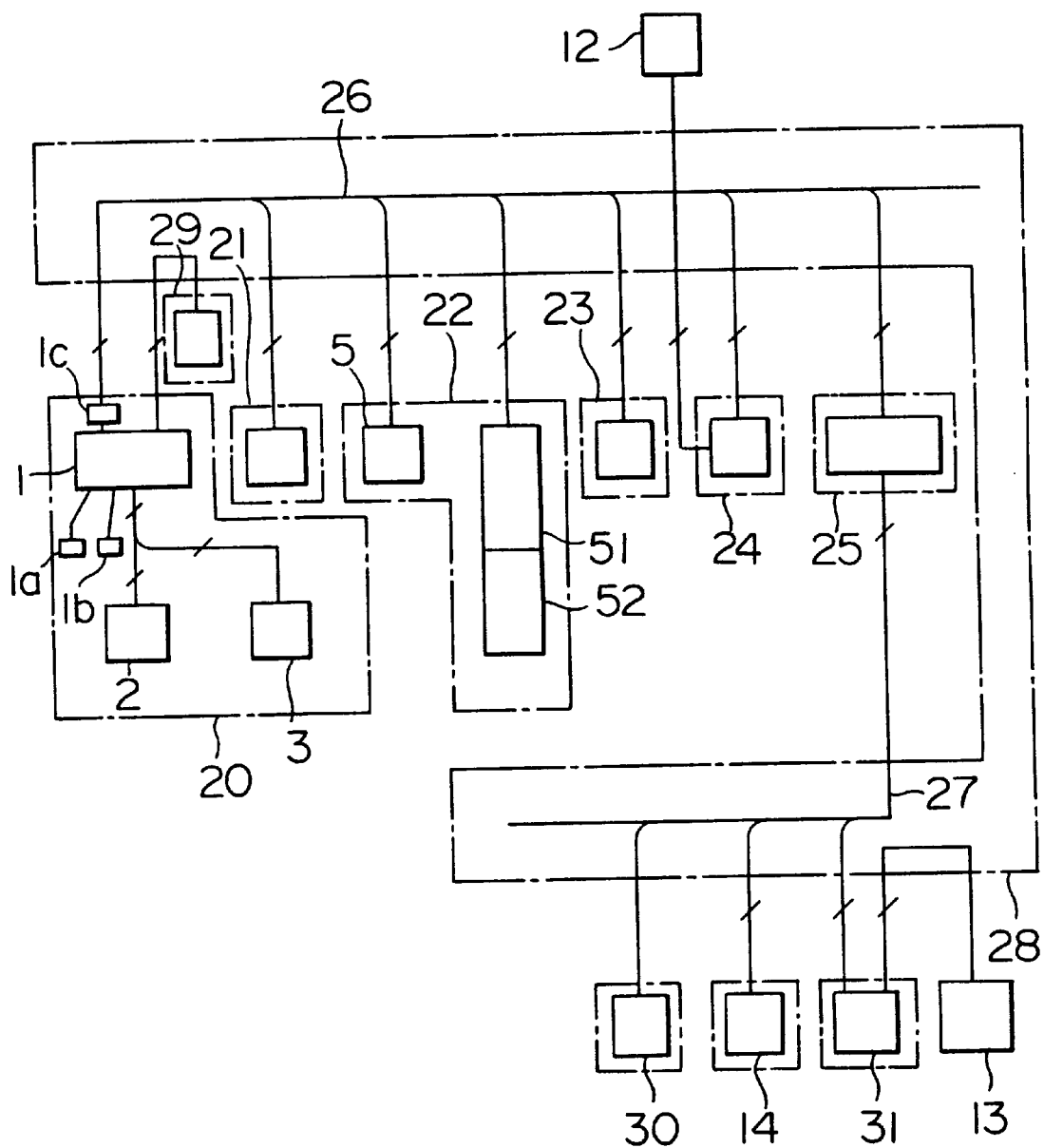
FIG. 5 is a block diagram illustrating a basic construction of the personal computer of FIG. 1, in which the functions of the computer are considered.
Figure 7:
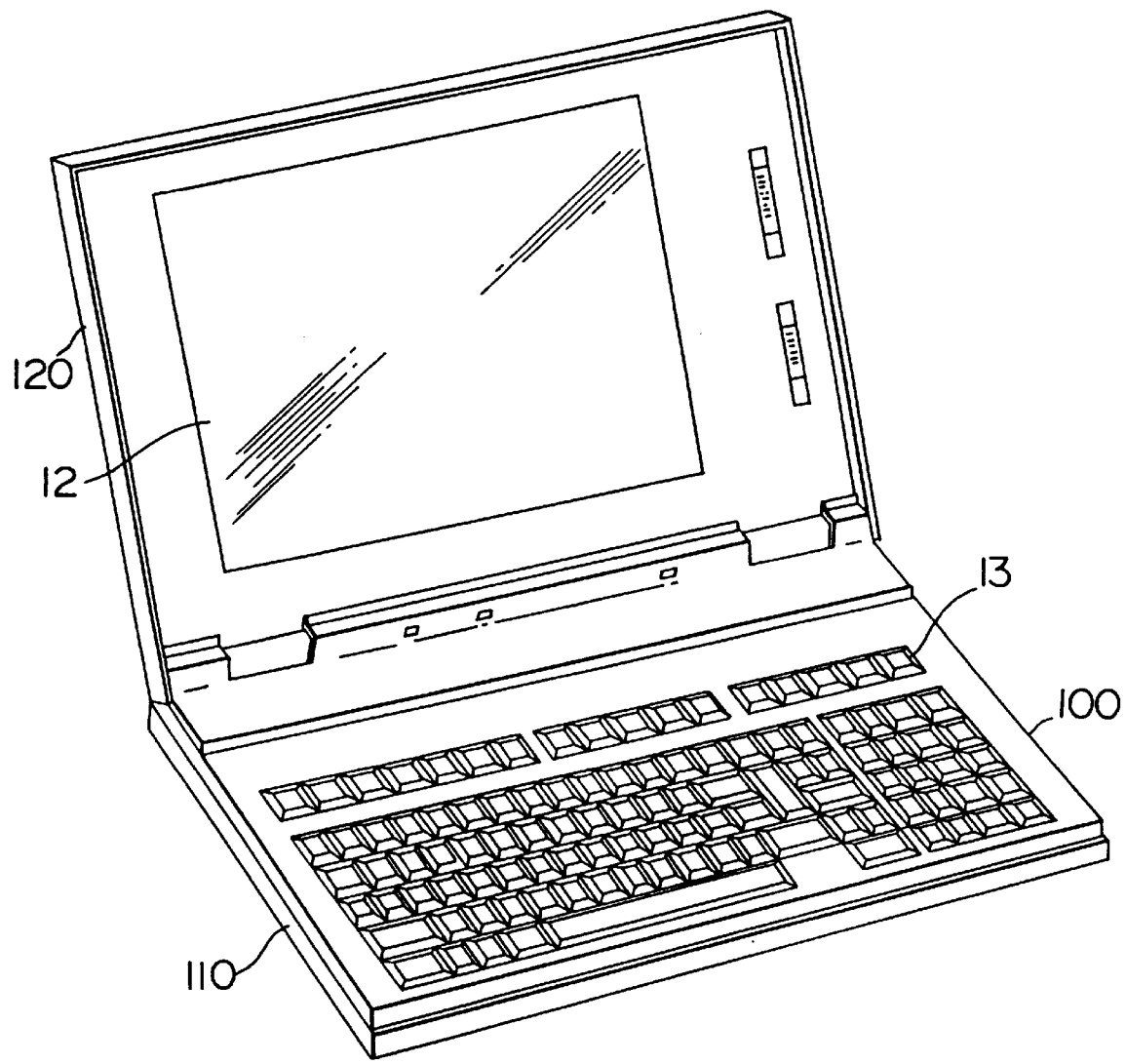
FIG. 7 is a perspective view illustrating the appearance of a notebook personal computer shown as an example of a conventional electronic apparatus.

FIG. 1 illustrates a notebook personal computer 100a of an embodiment of an electronic apparatus in accordance with the present invention. A portion of the electronic apparatus different from the conventional apparatus shown in FIG. 7 is the construction of an electronic circuit portion 130a housed within a main body portion 110 of the electronic apparatus. FIG. 2 is a plan view in which a lid portion 120 of the personal computer 100a shown in FIG. 1 is removed, and shows the electronic circuit portion 130a housed within the main body portion 110. FIG. 3 is a side view of the personal computer 100a of FIG. 2 taken in the direction of the arrow A. FIG. 4 is an illustration in which the electronic circuit portion 130a is taken out. FIG. 5 is a block diagram illustrating a basic construction of the personal computer 100a of FIG. 1, in which the functions of the computer are considered.

Figure 8:
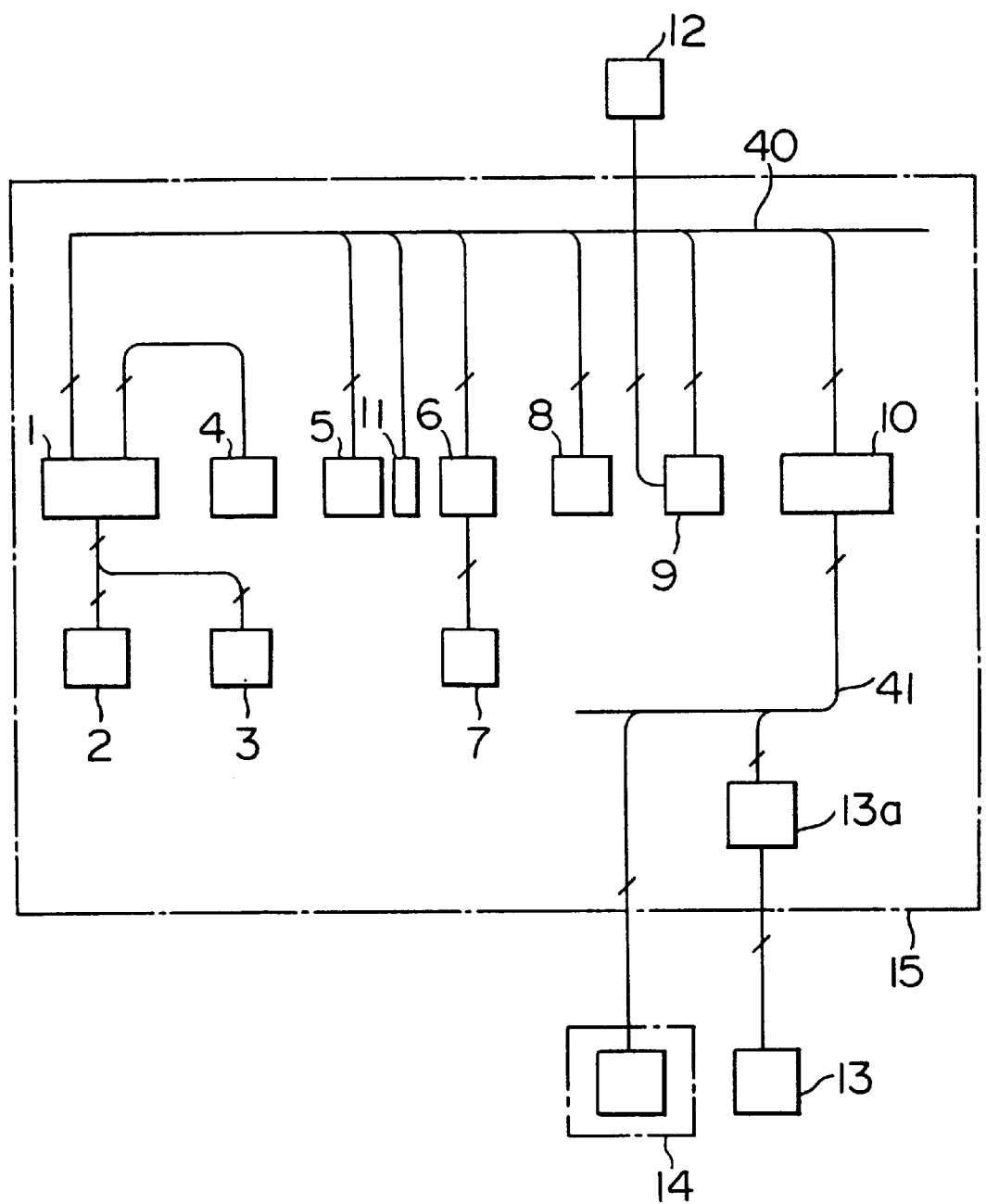
FIG. 8 is a block diagram illustrating a basic construction of the conventional personal computer of FIG. 7, in which the functions of the computer are considered.
Figure 9:
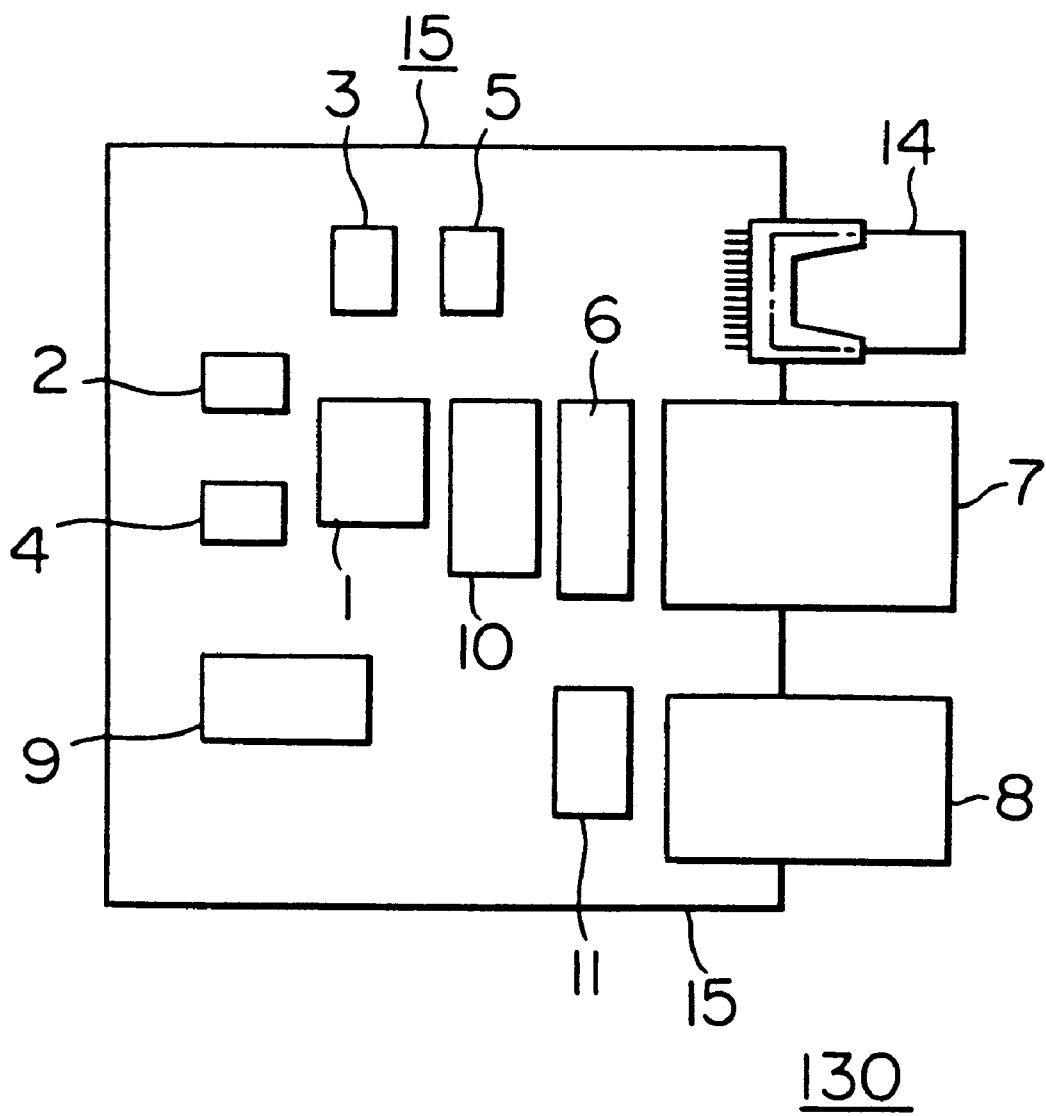
FIG. 9 is an illustration of a method of mounting electronic parts of the personal computer of FIG. 7.

In the electronic apparatus in accordance with the present invention, the electronic circuit portion thereof is formed of a mother board and card-like function media such as a plurality of IC cards which are removably connected to the mother board and separated in function block units. These card-like function media have the same shape (depth× width×thickness: 86×54×1 to 5 mm). In this embodiment, as shown in FIG. 5, the microprocessor section 1, the cashe memory section 2 and the numerical computational operation coprocessor section 3 are housed together within a microprocessor card 20. That portion of the card corresponding to the conventional main memory section 4 (see FIG. 8) is formed as a main memory card 29.

Since no floppy disk is used, the conventional BIOS section 5, the diskette controller section 6 and the diskette drive section 7 are formed as an OS/application card 22 which can take the direct execution format in which the BIOS section 5, an operation system (OS) 51 and an application program 52 are stored. In addition, since no hard disk for magnetic reading and writing is used, there is no conventional hard disk drive section 8 (see FIG. 8), and a solid-state disk card 23 which can be directly connected to the bus is used. In other words, conventional magnetic external storage media are not used at all, and all media are replaced with semiconductor memories. For a portion corresponding to the conventional disk emulator section 11, a disk emulation card 21 is provided in which a program and data for emulating the solid-state disk card 23 are stored. The conventional graphic subsystem section 9 for controlling the display section 12 is formed as a graphic subsystem card 24.

A mother board 28 is provided with bus means formed of two buses: a main bus 26 which may be a high-speed bus, and an input/output bus (I/O bus) 27 which may be a low-speed bus. These buses include a CPU bus, an address bus, a data bus, a control bus and the like. The cards 20 to 24, and 29 are connected to the main bus 26. An interface card 25 provides interface between the main bus 26 and the I/O bus 27. Connected to the I/O bus 27 are, in addition to a keyboard controller card 31 for the keyboard 13, the expansion memory card 14 an option card 30 for adding other special functions, and the like.

In the electronic circuit portion 130a, as shown in FIGS. 3 and 4, in practice, connectors 60 (first connectors) for fixedly connecting cards are disposed horizontally in two rows on the mother board 28. Cards 14, 20 to 25, and 29 to 31 each for a different function block are fixedly connected to these connectors. As indicated by the dotted line in FIG. 4, the main bus and the I/O bus for connecting the various cards are wired in multiple layers. Each connector 60 may be formed into a connector having a card eject button. A connector 32 (second connector) shown in FIG. 3 is used to make an electrical connection between display means such as the display section 12 and input means such as the keyboard 13 by means of connection lines 33 and 34, as shown in FIG. 2. Although in the notebook personal computer of this embodiment the display section 12 is a liquid-crystal display (LCD) device provided integrally with the main body portion 110, the display section may be a CRT display or the like disposed separately from the main body portion. The electronic circuit portion 130a is disposed so as not to obstruct the operation of the keyboard 13, and preferably, as shown in FIGS. 1 and 2, on a side of the main body portion 110, for example, opposite the side facing the user in such a way that a card may be mounted/dismounted. Although the electronic circuit portion 130a is illustrated as housed in the rear side of the top of the keyboard 13 so as to make it easy to understand the construction of the electronic circuit portion 130a in FIGS. 1 and 2, no problem is posed if the electronic circuit portion 130a is housed directly beneath the keyboard 13 so as to overlap with the keyboard 13 in order to make the main body portion 110 smaller.

Used as the above-described various cards 14, 20 to 25, and 29 to 31, which are card-like function media, are cards conforming to IC memory card guidelines Ver. 4.1 of the Japan Electronic Industry Development Association (JEIDA), cards conforming to the guidelines of the Personal Computer Memory Card International Association (PCMCIA), cards conforming to the guidelines of the Joint Electron Device Engineering Council (JEDEC), or removable cards similar to the above cards. As regards these guidelines, standard specifications were already laid open in Japan in June, 1990 and in September, 1991.

A file alignment table (FAT) file system using DOS and a direct execution format are defined for the OS/application card 22 for use in this invention. As no conventional floppy disk drives or hard disk drives are used, it is possible to execute application programs directly from a card-like function medium. Regarding the possibility of implementation of the solid-state disk card 23 in place of a hard disk drive which is a large capacity storage medium, implementation of a card having a storage capacity of approximately 100M bytes was described in an article entitled "Memory Card Large-Capacity Technology" in the Denpa Shinbun Newspaper of Aug. 22, 1991.

Next, the operation of this embodiment will be explained. As shown in FIG. 5, basically, the electronic circuit portion (function portion) of the electronic apparatus is separated in function block units, and this portion is replaced with card-like function media which can be mounted/dismounted easily in function block units. As each card is assembled and inspected singly, it is completely in good condition at first. The microprocessor card 20 has stored therein a general-purpose or dedicated microprocessor section 1 having a clock generating circuit 1a, a reset circuit 1b, and a bus buffer circuit 1c; a cashe memory section 2; and the numerical computational operation coprocessor section 3. Stored in the disk emulation card 21 are some functions of the OS/application card 22, programs for emulating the solid-state disk card 23, and data.

When a direct execution format is used in this system, only a small amount of the memory capacity of the main memory card 29 is required because the OS/application card 22 is used. All signal lines for signals input to or output from the general-purpose or dedicated microprocessor section 1 stored in the microprocessor card 20 are wired within the mother board 28 as the main bus 26. The main bus 26 produces a new I/O bus 27 within the mother board 28 by means of the bus interface card 25. That is, the main bus 26 is switched to the I/O bus 27 by means of the bus interface card 25. As mentioned earlier, in addition to the keyboard controller card 31, the expansion memory card 14 or an option card 30 can be connected to the I/O bus 27. Examples of this option card 30 include a LAN card, a modem card, a speech synthesis/output card, an access key card and the like. In some cases, these cards for adding functions are connected to the main bus 26.

Figure 6:
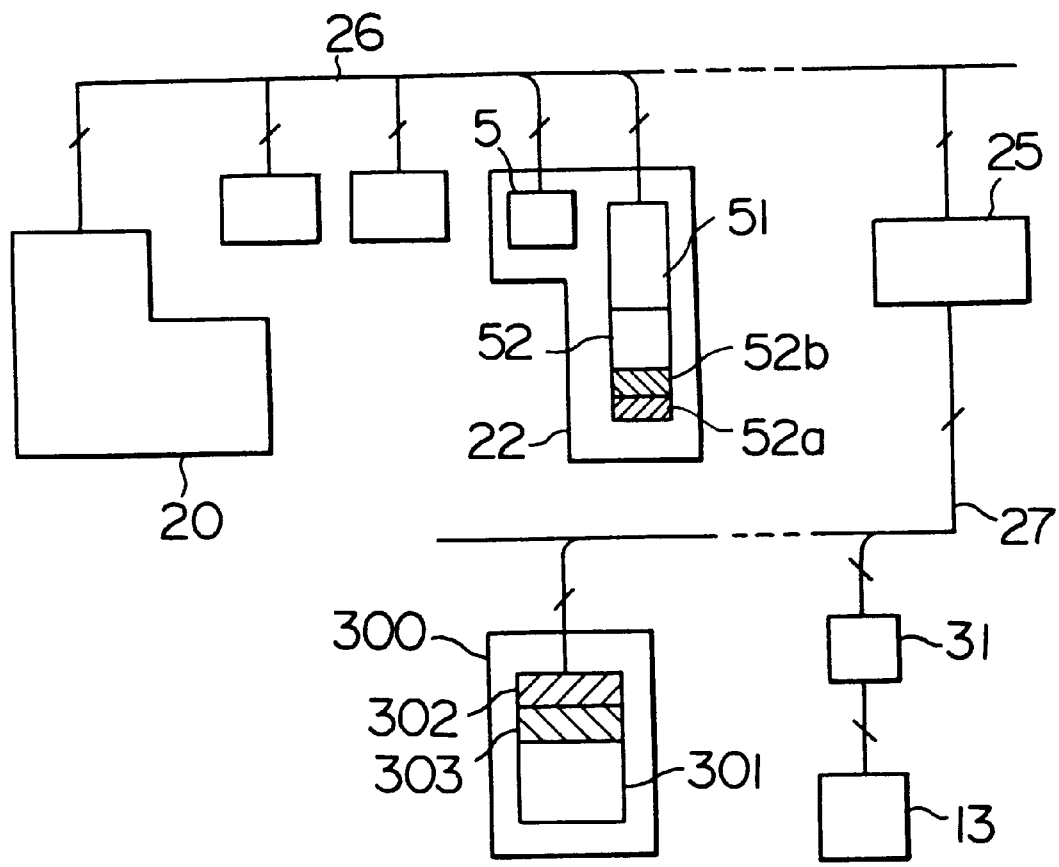
FIG. 6 is an illustration when an access key card is used in the personal computer of FIG. 1.

A case in which an access key card 300 is used as the option card 30 will now be explained. FIG. 6 is a schematic view illustrating only a portion necessary for illustrating the operation when the access key card 300 is used. The access key card 300 has a function for providing security for access to each card, and comprises a memory 301 in which an ID code 302, access information 303 such as data for specifying right of access to each card and an accessible range or codes for defining this range are stored. When the access key card 300 is used, an authorization program 52a is stored in a part of the application program 52 of the OS/application card 22. In addition, when an accessible range of the access key card 300 is stored in codes defining this range, a table 52b indicating the accessible range corresponding to each code is stored. When the access key card 300 is inserted into the connector 60 of the mother board 28, the microprocessor card 20 always performs at first an authorization operation for confirming a user in accordance with the authorization program 52a of the OS/application card 22. The microprocessor card 20 compares an ID code input from the keyboard 13 by the user with the ID code 302 stored in the access key card 300. When the ID codes are determined not to be the same, performance of subsequent operations will not be permitted. On the other hand, when the ID codes are determined to be the same and the validity of the user is confirmed, performance of the subsequent operations are permitted in accordance with the access information 303 on the right of access and the accessible range of the storage area of each card. When the access key card 300 has stored the accessible range of the storage area of each card in the form of codes, the accessible range is determined in accordance with the table 52b of the OS/application card 22.

According to the present invention, as described above, an electronic apparatus which is small, thin, light in weight, and consumes a small amount of power can be realized because each of the function portions installed in the conventional single-board computer is replaced with a plurality of card-like function media (IC cards), and the conventional floppy disk drive and the hard disk drive are replaced with the OS/application card 22 and the solid-state disk card 23. In addition, functions can be changed easily so that the electronic apparatus can be changed into another apparatus by changing to cards corresponding to respective function portion having new functions or by inserting a card having new respective functions as option cards.

Although in the above-described embodiment a notebook personal computer has been described as an example of the electronic apparatus, as it is possible to easily change functions by inserting cards corresponding to the functions without changing the configuration of the main body of the apparatus, a, for example, notebook personal computer, a lap-top personal computer, or a desk-top personal computer which withstands heavy use can be used as the electronic apparatus.

Although in the above-described embodiment a personal computer has been described, as the same advantages obtained with the personal computer can be obtained with other electronic apparatuses, the present invention is not limited to being used in a notebook personal computer, but can be used in various types of electronic apparatuses. In addition, although in the above-described embodiment cards are arrayed horizontally in two rows on the mother board, the cards are not limited to this arrangement for instead, the cards may be arrayed vertically in one row. The power-supply section or a back-up battery may be constructed of a similar removable card. In addition, although in the above-described embodiment the various functions are separately stored in 10 cards, the number of separations is not limited to this example.

When the present invention is used in a commonly used personal computer having a main body unit (main body portion) in which an electronic circuit portion is housed, a display section formed of a CRT display or the like, and a keyboard, which elements are disposed separately, it is possible to house various cards in a vacant area of the keyboard according to the mounting method of the present invention. Therefore, a personal computer can be constructed of only the keyboard and the display section. That is, a keyboard personal computer in which a high-performance keyboard and the electronic circuit portion (function portion) are made into an integral unit can be realized, so that the conventional main body unit is not needed.

As described above, since, in the electronic apparatus in accordance with the present invention, the electronic circuit portion (function portion) is formed of a mother board and a plurality of card-like function media (cards) which are connected to this mother board and separately stored in function problem units, some of the functions can be changed or a new product having completely different functions can be realized by replacing the card-like function medium with another medium. Thus, the apparatus can be standardized, the development process period can be shortened, and development costs can be reduced considerably. In addition, maintenance and inspection can be very easily performed, and even if a failure occurs, correction thereof is easy. In addition, as cards can be produced in large numbers and stock them for future use, and can be used with other apparatuses, production system for the electronic apparatus can be simplified, and bad stocktaking assets can be reduced.

When the present invention is applied to various personal computers, as no floppy disk drive or hard disk drive is used and these drives are replaced with semiconductor memories, an apparatus which is small, thin, light weight, and consumes a small amount of power can be obtained.

In addition, the connection of an access key card as an option card makes it possible to define right of access to each card and the corresponding operation range thereof, to easily provide security for protection of data. Thus, there is an advantage in that an apparatus having advanced functions can be obtained.

What is claimed is:

1. An electronic apparatus comprising:
an electronic circuit portion comprising:
- a plurality of IC cards, each card having a depth of 86 mm, a width of 54 mm and a thickness of between about 3 mm and about 16 mm said plurality of IC cards being arranged in function block units, each function block unit performing a separate function of the electronic apparatus, at least one of the function block units including a solid state disk card and an OS/application card;
- a plurality of connectors for detachably mounting said IC cards; and
- a mother board having a bus section including a main bus (high-speed bus) and an input/output bus (low-speed bus), which are independent of each other, for electrically connecting said plurality of IC cards to each other, said plurality of IC cards including a bus interface card for interfacing between the input/output bus and the main bus;

input means electrically connected to the electronic circuit portion for inputting information to said electronic circuit portion; and display means electrically connected to the electronic circuit portion.

2. An electronic apparatus as claimed in claim 1 wherein each function block unit includes at least one of said plurality of IC cards.

3. An electronic apparatus as claimed in claim 1 wherein the OS/application card includes a storage medium which stores a BIOS section, an operating system and an application program.

4. An electronic apparatus as claimed in claim 3 wherein said plurality of IC cards include:
- a microprocessor card, and
- an access key card having a memory storing an ID code and access information, wherein the microprocessor card compares information input from said input means with the ID code stored in the access key card and allows or inhibits further operation responsive to the comparison.

5. An electronic apparatus comprising:
an electronic circuit portion comprising:
- a plurality of IC cards arranged in function block units, each function block unit performing a separate function of the electronic apparatus;
- a mother board having a bus section including a main bus and an input/output bus, which are independent of each other, for electrically connecting said plurality of IC cards to each other;
- a plurality of connectors coupled to said mother board for detachably mounting said plurality of IC cards to said mother board;

input means electrically connected to the electronic circuit portion for transmitting information to said electronic circuit portion; and wherein said plurality of IC cards include 1) at least an access key card in which ID codes for authorizing use of the electronic apparatus, access information for specifying right of access to each of said plurality of IC cards and an access permission range for a data storage area of said IC cards are stored, 2) an OS/application card in which an operation system and an application program including an authorization program for permitting use of the electronic apparatus are stored, 3) a solid state disk card and 4) a microprocessor card for performing data processing and data control, performing an authorization operation on the basis of an ID code input from the input means and on the basis of the ID codes stored in the access key card in accordance with an authorization program stored in the OS/application card, and controlling access to each card in accordance with the access information.

6. An electronic apparatus as claimed in claim 5 wherein each function block unit includes at least one of said IC cards.

7. An electronic apparatus as claimed in claim 5 wherein each of said plurality of IC cards includes a depth of about 86 mm, a width of about 54 mm and a thickness of between about 1 mm and about 5 mm.

8. An electronic apparatus as claimed in claim 7 further comprising a body portion including a keyboard wherein the plurality of IC cards of said electronic circuit are disposed completely within said body portion abutting the keyboard.

9. A disk drive-free notebook computer comprising:
- a display;
- a main body portion having a keyboard on a top surface thereof;
- an electronic circuit portion comprising:
  - a plurality of IC cards arranged in function block units, each function block unit performing a separate function, said plurality of IC cards having a width of about 54 mm, a depth of about 56 mm and a thickness between about 3 mm and about 16 mm; and
  - a mother board including a plurality of first connectors disposed in rows for detachably mounting said plurality of IC cards, a plurality of second connectors for connecting the keyboard and the display section, and a bus section for electrically connecting each of said plurality of IC cards, the keyboard, and the display section to each other, said electronic circuit portion being disposed within the main body in such a way that each IC card is externally mountable.

10. An electronic apparatus as claimed in claim 4 wherein each function block unit includes at least one of said IC cards.

11. An electronic apparatus as claimed in claim 9 wherein each function block unit includes at least one of said plurality of IC cards.

12. A disk drive-free notebook computer according to claim 4 wherein said plurality of IC cards include 1) an OS/application card having a storage medium which stores a BIOS section, an operating system and an application program and 2) a solid state disk card.

13. A disk drive-free notebook computer as claimed in claim 12 wherein said plurality of IC cards include:
- a microprocessor card, and
- an access key card having a memory storing an ID code and access information, wherein the microprocessor card compares information input from said input means with the ID code stored in the access key card and allows or inhibits further operation responsive to the comparison.

14. A disk drive-free notebook computer as claimed in claim 13 wherein the plurality of IC cards of said electronic circuit are disposed completely within said body portion abutting the keyboard.

* * * * *